United States Patent [19]

Rathi et al.

[11] Patent Number: 4,995,087
[45] Date of Patent: Feb. 19, 1991

[54] MACHINE VISION SYSTEM

[75] Inventors: Rajendra P. Rathi, West Chester, Ohio; David G. Tashjian, Wilmington, N.C.; Richard H. Burkel, Maineville; Randall C. Gantner, Dayton, both of Ohio; John J. Bottoms, Arkansas City, Kans.; Steven M. Wolff, Sprongboro, Ohio

[73] Assignee: General Electric Company, Cincinnati, Ohio

[21] Appl. No.: 392,517

[22] Filed: Aug. 11, 1989

Related U.S. Application Data

[62] Division of Ser. No. 290,476, May 15, 1989.

[51] Int. Cl.⁵ .............................................. G06K 9/00
[52] U.S. Cl. .................................. 382/8; 364/167.01; 364/474.28
[58] Field of Search .................. 382/8, 22, 25, 48; 358/101, 107; 364/167.01, 474.28, 474.29; 219/121.7

[56] References Cited

U.S. PATENT DOCUMENTS

| | | | |
|---|---|---|---|
| 3,967,242 | 6/1976 | Isoo et al. | 340/146.3 H |
| 4,412,121 | 10/1983 | Kremers et al. | 219/124.34 |
| 4,493,968 | 1/1985 | Brown | 219/124.34 |
| 4,575,805 | 3/1986 | Moermann et al. | 364/474 |
| 4,670,849 | 6/1987 | Okada et al. | 364/474.28 |
| 4,673,795 | 6/1987 | Ortiz | 219/121 |
| 4,696,707 | 9/1987 | Lewis et al. | 364/167.01 |
| 4,698,570 | 10/1987 | Satoh | 364/167.01 |
| 4,703,415 | 10/1987 | Kishi et al. | 364/167.01 |
| 4,789,770 | 12/1988 | Kasner et al. | 219/121.7 |
| 4,843,287 | 6/1989 | Taft | 364/167.01 |

Primary Examiner—David K. Moore
Assistant Examiner—Jose L. Couso
Attorney, Agent, or Firm—Jerome C. Squillaro; Charles L. Moore, Jr.

[57] ABSTRACT

A vision system for automating a machine process. The system includes a conventional CCD camera and a vision processor which automatically determines process parameters from a workpiece surface by generating an image of the workpiece surface, transducing the workpiece image into electrical signals, and electronically determining the process parameters from the electrical signals. Applied to a laser welding process, the vision system locates workpiece edges, determines part centerline and thickness, and calculates process parameters such as weld location, the rate of delivery of weld powder, laser intensity, and the speed at which the weld is applied.

4 Claims, 6 Drawing Sheets

MACHINE VISION SYSTEM

This is a division of application Ser. No. 07/290476 filed May 15, 1989.

The present invention relates generally to the area of numerically controlled machines. More specifically, the present invention provides a method for determining or modifying machine process parameters from an image of a workpiece.

BACKGROUND OF THE INVENTION

Although numerical control has greatly improved the speed, reliability and consistency with which workpieces may be machined, cut, welded or otherwise operated upon, many manufacturing and repair tasks remain time consuming operations. For example, high pressure turbine blades used in aircraft jet engines are susceptible to tip wear. Presently, tip repair of engine run parts is a time-consuming task in which build-up welding is applied manually by a skilled welder to the blade tip of the turbine blade. Automation of this process has been difficult due to the non-uniformity of turbine tip wear and variations in blade tip surfaces from blade to blade which require adjustment of welding parameters prior to each blade repair. Attempts to automate the tip repair Process through the application of computer aided design (CAD) techniques to define a weld path have resulted in inconsistent blade tip repairs due to the variations in tip wear and differential stresses from blade to blade.

Many automated machine systems employ probing systems for verifying workpiece location or dimensions, with probe results thereafter utilized to determine offsets to be applied to nominal workpiece dimensions or coordinates. For example, coordinates defining the location of a hole to be drilled in a workpiece may be adjusted after a probing cycle to maintain the hole location at a predetermined distance from a part edge. Non-contacting, probe-less inspection systems, referred to herein as vision systems, have similarly been employed to verify workpiece location or dimensions. In addition, vision systems have been used in the past on relatively simple objects to recognize and verify object shapes. Some automated machine systems utilize the results of this recognition step to select machine programming for execution or to retrieve predetermined process parameters from storage in a memory device.

The present invention contemplates a vision system which differs from the above described prior art probing systems and vision systems in that the system described below actually measures and mathematically describes the geometry of a workpiece and generates process parameters from an image of the workpiece surface.

OBJECTS OF THE INVENTION

It is a primary object of the present invention to Provide a new and improved method and apparatus for automating a machining process in which process parameters are automatically determined from an image of a workpiece surface. It is an additional object of the present invention to provide a method and apparatus for use in an automated machining process which automatically adjusts process parameters to compensate for part-to-part variations in workpiece geometries. It is a further object of the present invention to provide a new and improved method and apparatus for automating a build-up welding process which automatically adjusts welding parameters to compensate for part-to-part variations in workpiece geometries, thereby providing improved output product quality and uniformity.

It is also an object of the present invention to provide a new and improved method and apparatus for restoring mechanically worn tips of aircraft engine airfoils.

SUMMARY OF THE INVENTION

In accordance with the principles of the present invention, there is provided a vision system for automating a machine process. The system automatically determines process parameters from a workpiece surface by generating an image of the workpiece surface, transducing the workpiece image into electrical signals, and electronically determining the process parameters from the electrical signals.

Applied to a laser welding process, the vision system locates workpiece edges, determines part centerline and thickness, and calculates process parameters such as weld location, the rate of delivery of weld powder, laser intensity, and the speed at which the weld is applied.

The novel features believed to be characteristic of the present invention are set forth in the claims. The above and other objects of the present invention together with the features and advantages thereof will become apparent from the following detailed specification when read in conjunction with the accompanying drawings in which applicable reference numerals have been carried forward.

DETAILED DESCRIPTION OF THE INVENTION

Figure 1:
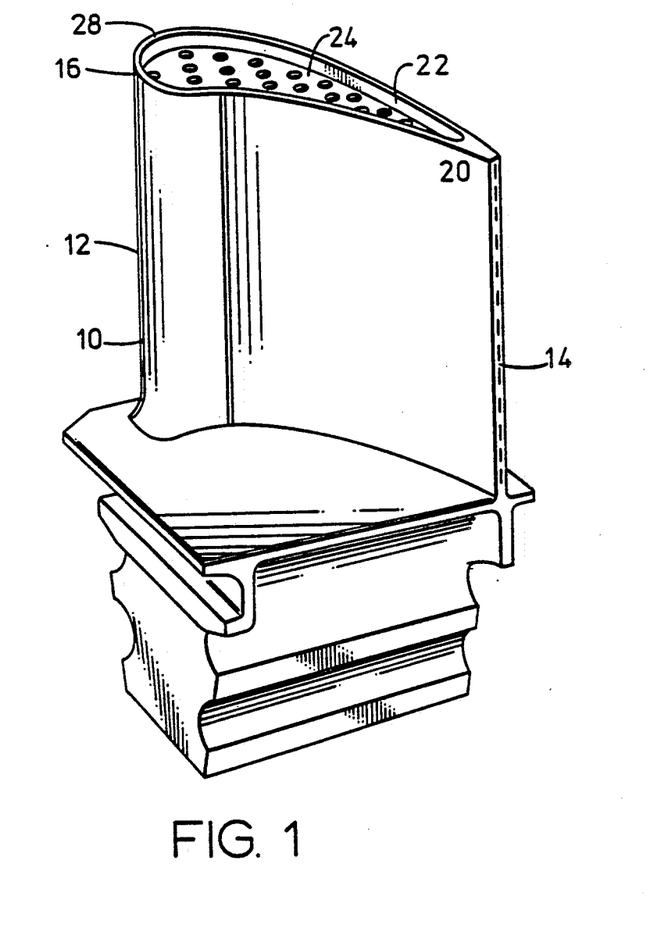
FIG. 1 is a Perspective view of a typical aircraft engine airfoil including a tip of the squealer type to be repaired through a build-up welding process.

FIG. 1 is a Perspective view of a rotor blade including a tip of the squealer type. Blade 10 includes a leading edge 12, a trailing edge 14 and, at the radially outer end of blade 10, a squealer-type blade tip 16. Squealer tip wall 28 includes an outer edge 20 and an inner edge 22. Cavity 24 is formed by tip wall 28. Tip wall 28, outer edge 20, inner edge 22 and cavity 24 are also shown in top view in FIG. 2.

Figure 2:
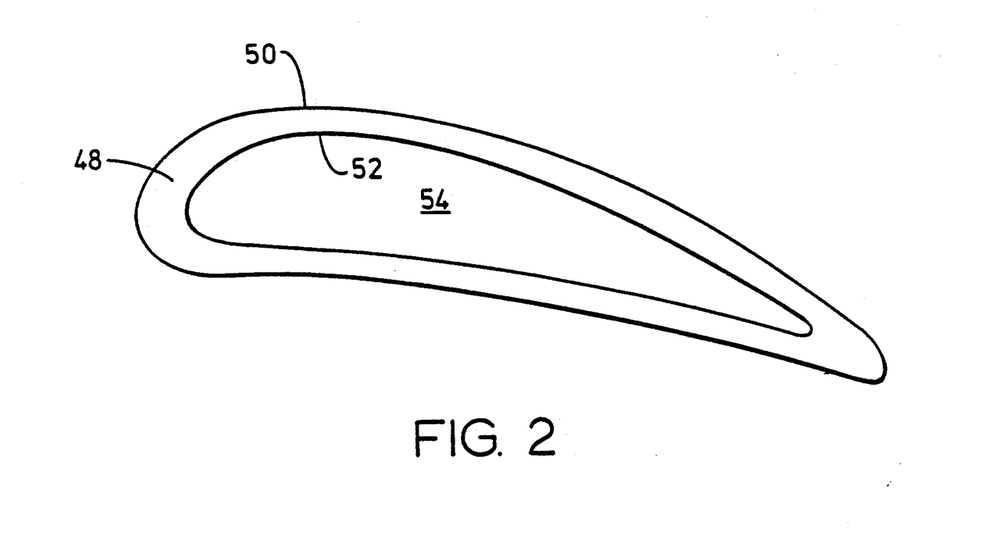
FIG. 2 is a top view of the airfoil of FIG. 1.

Restoration of worn squealer tip surfaces on rotor blades, such as blade 10 shown in FIG. 2, has been a time-consuming task in which build-up welding is applied manually by a skilled welder to the squealer tip walls of the turbine blade, a task which typically requires one man-hour of work from a skilled welder per turbine blade. Automating this repair process has been difficult because of the non-uniformity of turbine tip wear and variations in squealer tip wall surfaces from blade to blade. These blade-to-blade variations require changes in welding process parameters prior to each blade repair.

Figure 3:
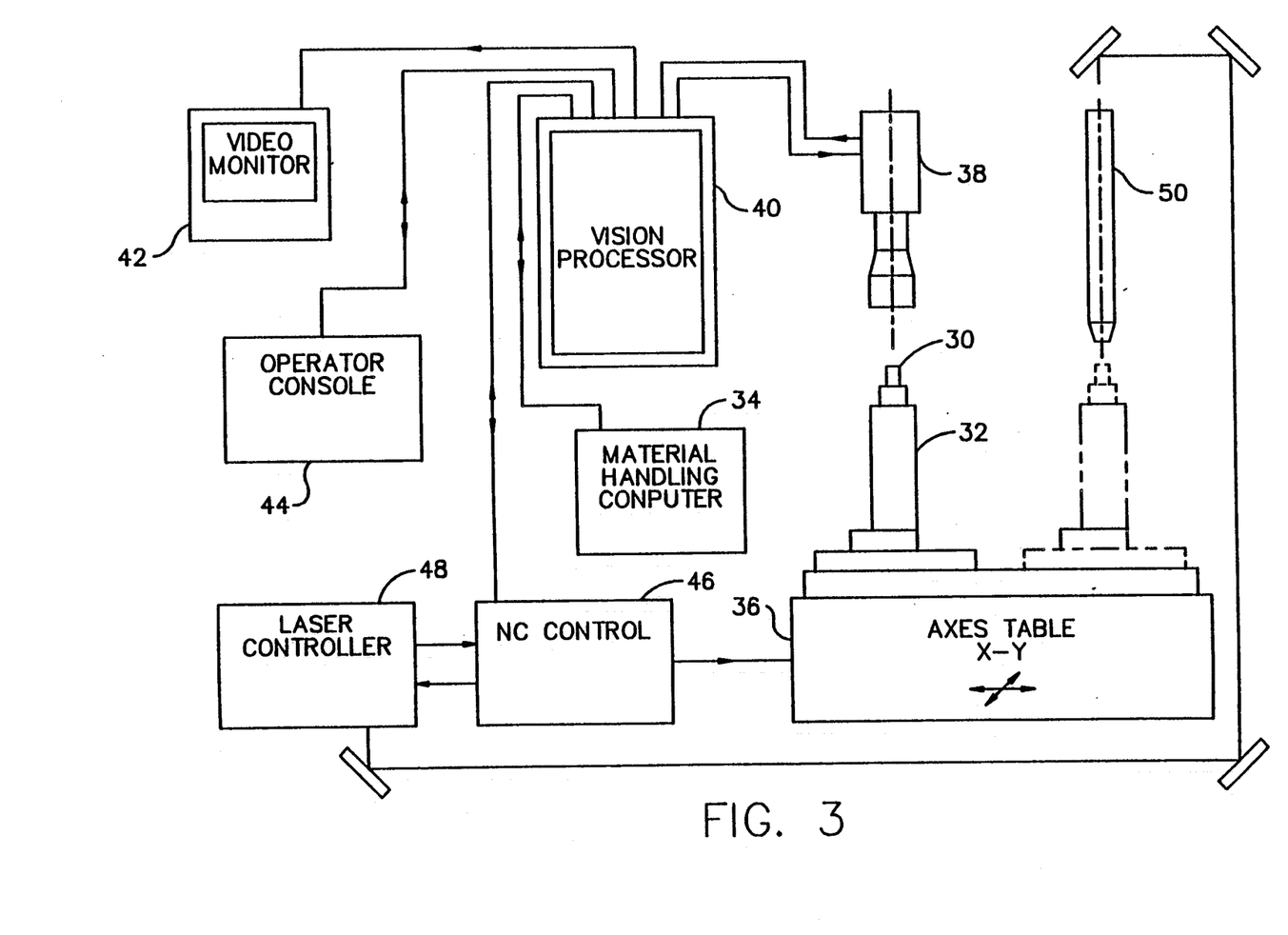
FIG. 3 is a block diagram of a laser system including a vision system in accordance with the present invention.

FIG. 3 is a block diagram of an automated laser system for performing build-up welding of squealer tip walls of aircraft engine airfoils. The laser welding system includes a vision system in accordance with the present invention. The tip surface of an airfoil 30 to be processed by the laser system is cleaned and ground. Airfoil 30 is then secured in a mounting fixture 32. A material handling computer 34 controls a conveyor and push rod system (not shown) which delivers mounting fixture 32 and the airfoil secured thereto onto a numerically controlled axes table 36. Axes table 16 receives fixture 32 from the push rod system and moves airfoil 30 into the field of view of a solid state CCD camera 38 such as a Pulnix America, model no. 240-T, for inspection by the vision system.

The vision system includes camera 38, a vision processor 40, a video monitor 42, and an operator console 44. The scanning mechanism within camera 38 generates a video signal from an image of the airfoil and provides this signal to vision processor 40. The vision processor, which may be an International Robomation-/Intelligence model DX/VR vision computer, determines weld and laser parameters such as weld location, the rate of delivery of weld powder, laser power intensity, and the speed at which the weld is applied. The vision processor interfaces with material handling computer 34, a numerical controller 46, and a laser controller 48 to control the laser operation, beam delivery, weld powder delivery, and positioning of the workpiece under laser 50.

Monitor 32 permits viewing of the welding process by a human operator. Console 44 allows the operator to communicate with the vision processor and override or modify vision system programming.

Figure 4:
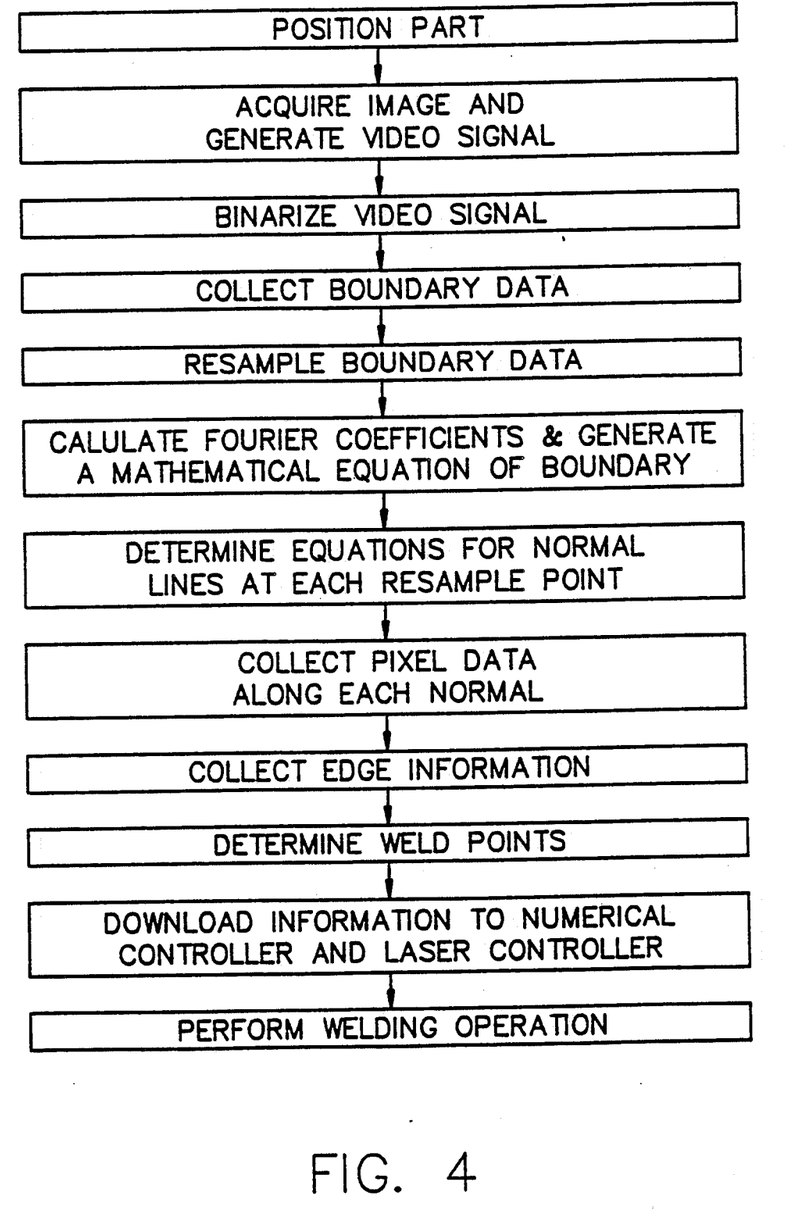
FIG. 4 is flow diagram illustrating practice of the present invention.

The process employed by the apparatus of FIG. 3 for automatically determining welding parameters is illustrated in the flow diagram of FIG. 4. Before image information can be obtained and processed the airfoil must be placed in a known position within the field of view of camera 38. The vision system communicates with axis controller 46 to position airfoil 30 and pallet 32, to which the airfoil has been secured, at the proper location under camera 38.

Camera 38 is focused so that an image of the top surface of the squealer tip wall of airfoil 30 is formed on the photosensitive array within the camera and converted by the scanning mechanism within the camera into a video signal. The Pulnix America model T-240 CCD camera includes a 256x256 photosensitive array matrix, thus resolving the received image into 65,536 picture elements or pixels. The video signal is provided to vision processor 40 which converts the video signal into digital pixel data, assigning a luminance value of between 0, for black, and 255, for white, to each picture element of the matrix.

In order to differentiate between the part surface (top of squealer tip wall) and the background, the digital pixel information is next binarized, or converted to values of either 0 (black) or 255 (white). This process can be more readily understood by referring to the graph shown in FIG. 5.

Figure 5:
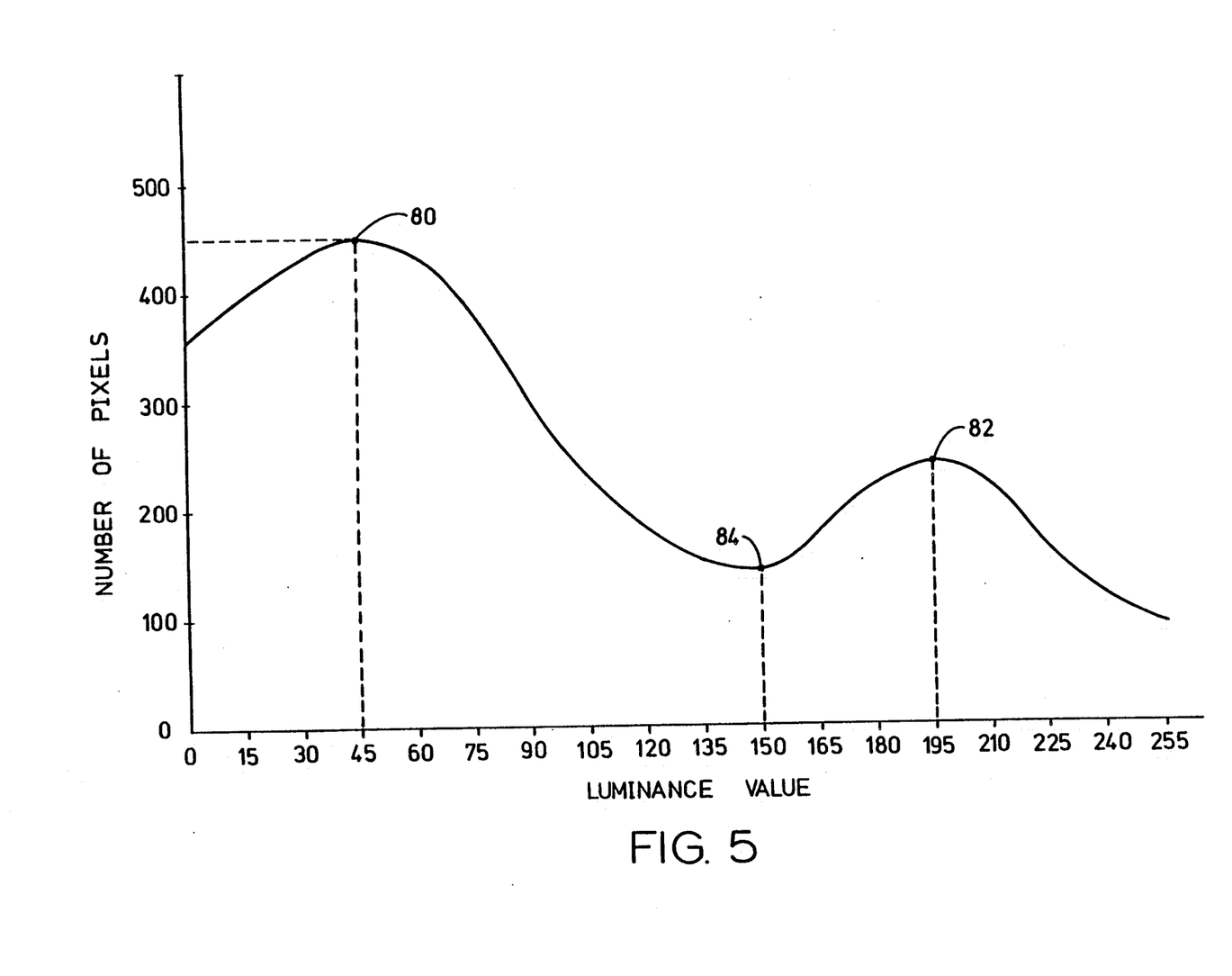
FIG. 5 is a histogram showing the distribution of picture elements at various luminance values.

Luminance values ranging from 0 to 255 are displayed along the X-axis of the graph. Plotted vertically along the Y-axis is the total number of Pixels found during one frame scan to have the luminance value indicated. For example, point 80 indicates that approximately 450 pixels have a luminance value of 45. As can be seen, the graph includes two peaks, at points 80 and 82, and a valley having a low point at point 84. Relatively little light will be reflected from the background area surrounding the squealer tip wall, accordingly the majority of pixels are seen to have a low luminance value, with a maximum number of pixels having a luminance value of 45 (point 80). The top surface of the squealer tip wall, which has been cleaned and ground and positioned in the camera's focal plane reflects a greater amount of light than the background area. These pixels form the portion of the graph having luminance values around 195 and peaking at point 82.

The vision system is programmed to search for the valley located between peaks 80 and 82. The luminance value associated with the low point of the valley, point 84 having a luminance value of 150, is utilized to binarize the digital pixel data All pixels having luminance values less than 150 are assigned a value of 0 (black) and all Pixels having a luminance value greater than 150 are assigned a value of 255 (white) Each pixel's coordinates and associated binary value are stored in memory within the vision processor.

It should be noted that the graph of FIG. 5 is exemplary only. The shape of the graph, distribution of pixels along the luminance scale and the threshold luminance value of 150 are illustrative only. Actual pixel counts as well as the locations of peaks and valley will differ from that shown in FIG. 5.

The vision system next collects the pixel data defining the outer boundary of the top surface of the squealer tip wall. The boundary following algorithm employed to collect the boundary data is more easily explained by referring to FIG. 6. The shape identified by reference numeral 90 represents the image of the tip of a turbine blade Each "+" and each "W" indicates the location of a picture element or pixel. Those pixels indicated by a "W" are associated with the blade tip surface and have binary values of 255 or white. The pixels identified by a "+" are associated with the object background and have binary values of 0 or black. The X and Y coordinates of each pixel can be determined by referring to the coordinate values shown along the bottom and left side respectively of the figure. For example, pixel 94 has an X-coordinate of 2, and a Y-coordinate of 5. The shape of blade tip 90 and the location of pixels shown in FIG. 6 have been greatly exaggerated to assist in the explanation of the operation of the boundary following algorithm.

Figure 6:
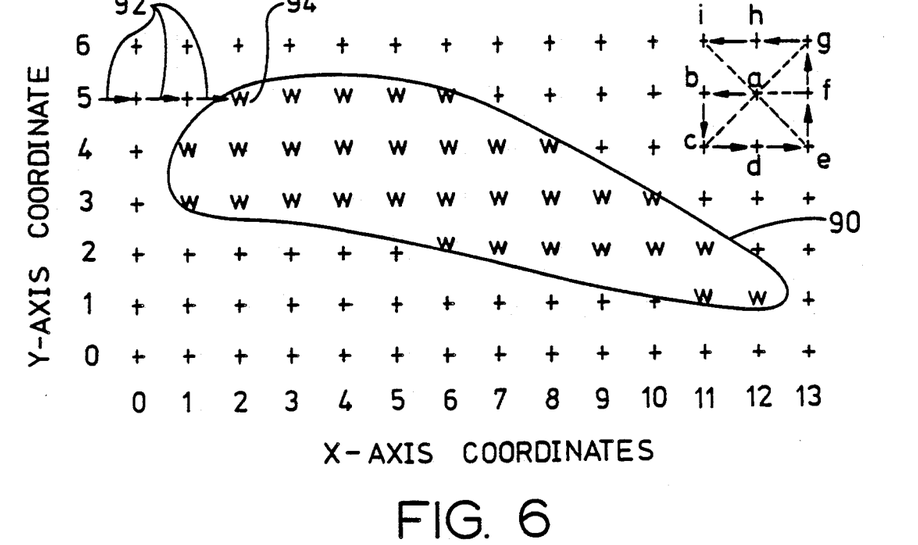
FIG. 6 illustrates the boundary following algorithm employed to collect the boundary data associated with the outer edge of the squealler tiP wall.

The boundary following algorithm scans the pixel data stored in memory within the vision processor, scanning the data from left to right across FIG. 6, as shown by arrows 92, until a pixel with a luminance value of 255 is located. For example, pixel 94 having coordinates of x=2 and y=5 is shown to be the first boundary point located by the boundary following algorithm. The coordinates of this first pixel are saved. The algorithm next inspects the pixels adjacent to this first pixel to locate a second boundary point, searching in a counterclockwise direction about the first pixel This search routine is shown in the upper right corner of FIG. 6. Having identified pixel "a" as a boundary point, the search routine inspects the adjacent pixels in the order b→c→d→e→f→g→h→i to identify the next boundary point. The coordinates of the newly discovered boundary point are thereafter saved and a counterclockwise search about this point is conducted. The search continues until the first point is found again, completing a closed loop.

To simplify subsequent calculations and reduce processing time, the boundary data is resampled to reduce the number of boundary points, which may be several hundred, to a smaller, more manageable number. The resampling selects points equally spaced along the boundary. In the system described herein the recommended number of resampled points is 64.

Equations defining the boundary can be determined from the 64 resampled points using Fourier analysis techniques. While it is possible to develop algorithms that will work with any number of points, maximum efficiency of computation is obtained by constraining the number of boundary points to be an integer power of two, such as 32, 64 or 128. This efficiency results from the binary system upon which computer architecture is designed.

The Part boundary forms a closed curve which can be expressed as a function of distance "t" from an initial Point on the boundary, tracing counterclockwise along the curve. Since the boundary forms a closed loop, the function is periodic and can be expanded in Fourier series:

$$f(t) = \sum_{n=-\infty}^{\infty} C_n e^{j2\pi nt/T} \quad \text{(EQN 1)}$$

where $$C_n = \frac{1}{T} \int_{-T/2}^{T/2} f(t) e^{-j2\pi nt/T} dt. \quad \text{(EQN 2)}$$

Various terms associated with the above equations are defined as follows.

$C_n$ = complex Fourier coefficient
$j = \sqrt{-1}$
T = total distance about the closed curve
n = number of coefficients The curve fitting algorithm employed within the vision system uses Fourier analysis techniques to generate a complex number which can be expressed in vector form as:

$$f(t) = x(t) + jy(t). \quad \text{(EQN 3)}$$

This equation is thereafter utilized to calculate equations for a plurality of lines normal to the boundary.

A line normal to EQN 3 at a point $t = t_l$ can be determined from the equation $y - y_l = (-1/m)(x - x_l)$, where m is the y-x slope of f(t) at point $t = t_l$. Slope m can be determined by dividing the partial derivative of y(t), $\partial y/\partial t$, at point $t = t_l$ by the partial derivative of x(t), $\partial x/\partial t$, at point $t = t_l$. A line normal to EQN 3 is generated at each one of the 64 resample points.

Figure 7:
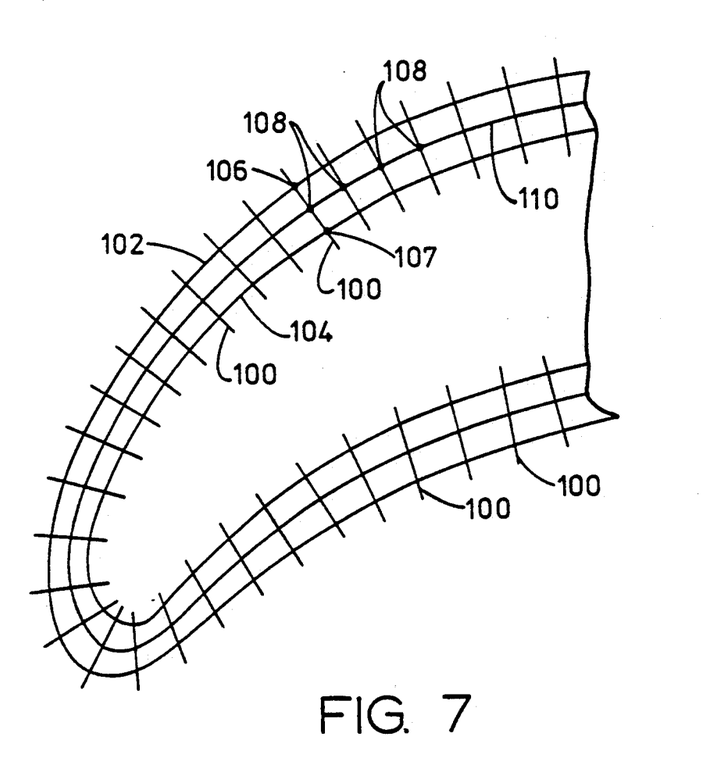
FIG. 7 is an image of a portion of the airfoil of FIG. 2 after vision Processing in accordance with the present invention.

Please refer to FIG. 7 which is an image of a portion of the airfoil of FIG. 2 after vision processing in accordance with the present invention for an explanation of how weld path and part thickness are determined. The binarized luminance values for the pixels located along each normal are examined to locate the outer edge 102 and inner edge 104 of the squealler tip wall, an edge point being identified wherever adjacent Pixels along a normal line have significantly different luminance values. For example, normal line 100 includes an outer edge point 106 and an inner edge point 107. The two equations which follow are employed to determine a weld point along each one of the 64 normal lines.

$$x = x_l + p(x_2 - x_l) + b_x \quad \text{(EQN 4)}$$

$$y = y_l + p(y_2 - y_l) + b_y \quad \text{(EQN 5)}$$

In the above equations $x_l$ and $y_l$ are the coordinates of the outer edge point along a normal line; $x_2$ and $y_2$ are the coordinates of the inner edge point along the same normal line; and p and b are variables set by the user. The variable p can range in value from 0 to 1 and represents the ratio of the distance between the weld point and the outer edge Point to the total distance between the outer and inner edge points. For example, a value of 0.5 for p indicates that the weld point is to be located at the midpoint of the line segment between points $(x_l, y_l)$ and $(x_2, y_2)$. Variable b is a distance utilized to directly bias the location of the weld point $b_x$ and $b_y$ are the x and y components of variable b, respectively.

The coordinates of 64 weld points are determined through utilization of the above equations. These 64 points define the weld path. In the special case where p is chosen to be 0.5 and b is chosen to be 0, the weld path is the centerline or mean line of the squealler tip wall. The weld path can be positioned closer to the outer (or inner) edge of the squealler tip wall by varying the parameters p and b. Part thickness along any normal line can easily be determined by calculating the distance between the two edge points identified along the normal.

Figure 8:
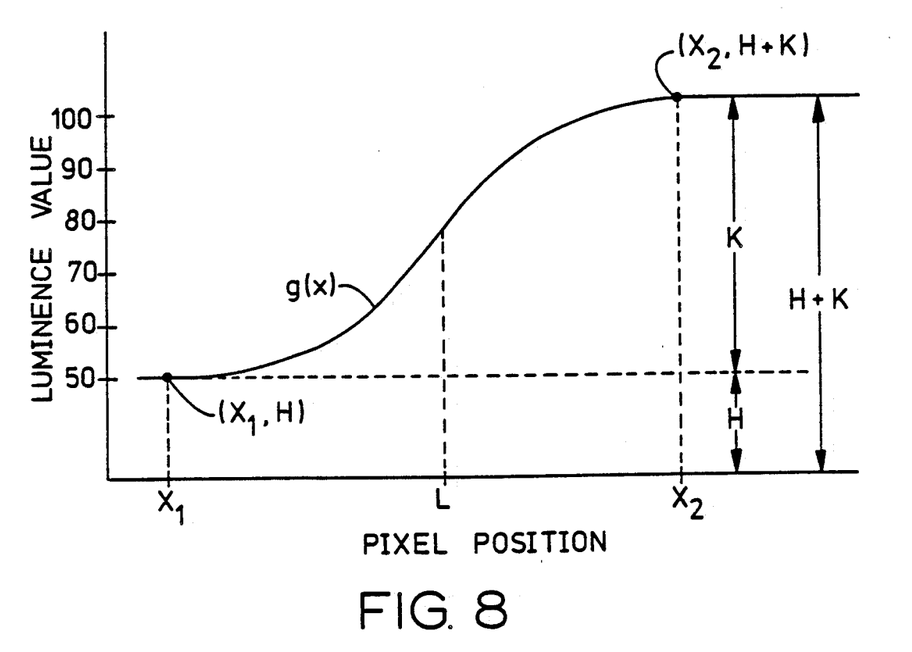
FIG. 8 illustrates a Process known as sub-pixelation for more precisely locating the edges of the squealler tip wall.

The location of inner and outer edge points along each normal line may be more precisely determined through a process called sub-pixelation. Using this process, the precise location of an edge point is determined by plotting the luminance value of each pixel along a normal line, in the vicinity of the Part edge, against the pixel's position along the normal line. FIG. 8 is an illustration of this relationship between luminance value and pixel location.

Referring now to FIG. 8, g(x) is the function which defines the relationship between luminance value and pixel position, where the variable x represents pixel position. The minimum luminance value, which is associated with the object background, is identified as "H". The maximum luminance value, which is associated with the top surface of the blade is identified as "H + K". The portion of g(x) between $x = x_l$ and $x = x_2$, where g(x) increases in value from H to H + K, corresponds to the part boundary. The precise location of the part edge, identified as "L" in FIG. 8, can be determined by calculating the zero degree ($M_0$), first degree ($M_l$), and second degree ($M_2$) moments of function g(x).

$$M_0 = \int_{x_1}^{x_2} g(x)dx = 2H + K - Lk \quad \text{(EQN 6)}$$

$$M_1 = \int_{x_1}^{x_2} xg(x)dx = K(1 - L^2)/2 \quad \text{(EQN 7)}$$

$$M_2 = \int_{x_1}^{x_2} x^2 g(x)dx = [2H + K(1 - L^3)]/3 \quad \text{(EQN 8)}$$

The precise object edge location is thereafter calculated by solving the above moment equations for L.

$$L = (3M_2 - M_0)/2M_l \qquad \text{(EQN 9)}$$

The vision processor also utilizes the weld path data, thickness data, boundary data, and other coordinate data to determine additional weld and laser parameters such as the rate of delivery of weld powder, laser intensity, and the speed at which the weld is applied.

After all of the process parameters have been calculated, the coordinate and process parameter information is provided to the numerical controller and laser controller, the workpiece is positioned under the welding laser, and build-up welding applied to the squealler tip wall.

From the foregoing specification it will be clear to those skilled in the art that the present invention is not limited to the specific embodiment described and illustrated and that numerous modifications and changes are possible without departing from the scope of the present invention. For example, many curve fitting algorithms are available or can be developed for generating an equation from a plurality of known points on a curve. Also, the acquired workpiece image may be in the visible, ultraviolet or infrared range, or may be determined through ultrasound or x-ray inspection.

Higher resolution cameras and corresponding vision processors may be utilized to obtain more accurate workpiece information. Better accuracy and higher resolution can also be obtained by processing the workpiece in sections, a total inspection of the workpiece being obtained by repeating the process at several different Positions of the workpiece under the camera. The data thus obtained can thereafter be concatenated to obtain a complete inspection of the entire workpiece.

Because the vi$ion system described above is independent of the machining process to be performed, it is not limited to automation of a laser welding operation, and may be adapted to operate with other machine processes such as grinding, cutting, deburring, stamping, drilling, pressing, inspecting, and gauging.

These and other variations, changes, substitutions and equivalents will be readily aPparent to those skilled in the art without departing from the spirit and scope of the present invention. Accordingly, it is intended that the invention to be secured by Letters Patent be limited only by the scope of the appended claims

What is claimed is:

1. A method for guilding a tool along a workpiece surface, the steps comprising:
    generating an image of said workpiece surface; dissecting said image into a plurality of picture elements;
    identifying the coordinates of a set of picture elements associated with a boundary of said workpiece surface;
    generating a mathematical equation from said picture element coordinates, said equation defining a curve formed by the boundary of said workpiece surface;
    selecting a first plurality of points along said curve;
    electronically determining a slope for said curve at each of said first plurality of points ;
    generating a set of mathematical equations, each of said equations defining a line normal to said curve and each normal line intersecting said curve at a different one of said first plurality of points;
    identifying a second plurality of points, each one of said second plurality of points being located along a different one of said normal lines at a predetermined distance from an associated one of said first plurality of points; and
    guiding said tool along a path including said second plurality of points.

2. A method for guiding a tool along a workpiece surface, comprising the steps of:
    generating an image of said workpiece surface, said step of generating an image including the steps of illuminating said surface, and focusing electromagnetic energy reflected from said surface onto a sensor;
    dissecting said image into a plurality of picture elements;
    identifying the coordinates of a set of picture elements associated with a boundary of said workpiece surface, said step of identifying the coordinates of the set of picture elements including the steps of:
        (a) assigning a luminance value to each picture element, the magnitude of said luminance value being proportional to the intensity of electromagnetic energy associated with the corresponding picture element, and
        (b) comparing said luminance values to identify picture elements associated with said workpiece surface and picture elements associated with background areas;
    generating a mathematical equation from said picture element coordinates, said equation defining a curve formed by the boundary of said workpiece surface;
    selecting a first plurality of points along said curve;
    electronically determining a slope for said curve at each of said first selected points;
    generating a set of mathematical equations, each of said set of equations defining a line normal to said curve and each normal line intersection said curve at a different one of said first plurality of points;
    identifying a second plurality of points, each one of said second plurality of points being located along a different one of said normal lines at a predetermined distance from an associated one of said first plurality of points; and
    guiding the tool along a path including said second plurality of points.

3. The method of claim 2, wherein said step of comparing luminance values to identify picture elements associated with said surface and picture elements associated with background areas includes the steps of:
    determining a threshold luminance value;
    comparing said picture element luminance values to said threshold luminance value;
    identifying picture elements associated with said surface as those having luminance values greater than said threshold value; and
    identifying picture elements associated with said background as those having luminance values less than said threshold value.

4. The method of claim 1, wherein:
    said step of generating a mathematical equation from said picture element coordinates includes the step of determining a set of fourier Coefficients corresponding to said picture element coordinates and substituting said Fourier Coefficients into a Fourier Series equation; and
    said step of electronically determining the slope of said curve at selected points along said curve includes the step of calculating the derivative of said Fourier Series equation at said selected points.

* * * * *